(12) United States Patent  
Danz et al.

(10) Patent No.: US 8,328,265 B2
(45) Date of Patent: Dec. 11, 2012

(54) KINEMATIC ARRANGEMENT FOR A COVER OF A STORAGE COMPARTMENT IN A VEHICLE

(75) Inventors: Thomas Danz, Dornstetten-Hallwangen (DE); Peter Muehllehner, Sulz a. N. (DE); Frank Werner, Ammerbuch (DE); Dennis Puskar, Algonac, MI (US); Michael Summersett, Royal Oak, MI (US)

(73) Assignee: Fischer Automotive Systems GmbH & Co. KG, Horb (DE)

( * ) Notice: Subject to any disclaimer, the term of this patent is extended or adjusted under 35 U.S.C. 154(b) by 296 days.

(21) Appl. No.: 12/375,060

(22) PCT Filed: Aug. 17, 2007

(86) PCT No.: PCT/EP2007/007200
§ 371 (c)(1),
(2), (4) Date: Feb. 23, 2011

(87) PCT Pub. No.: WO2008/022733
PCT Pub. Date: Feb. 28, 2008

(65) Prior Publication Data
US 2011/0156432 A1 Jun. 30, 2011

(30) Foreign Application Priority Data
Aug. 19, 2006 (DE) .......................... 10 2006 039 021

(51) Int. Cl.
*B60R 7/04* (2006.01)
*B60R 7/06* (2006.01)
(52) U.S. Cl. .................. 296/37.8; 296/37.12; 312/330.1; 312/350
(58) Field of Classification Search ............... 296/37.12, 296/37.8, 37.13, 24.43, 26.1, 24.34; 312/330.1, 312/349, 350
See application file for complete search history.

(56) References Cited

U.S. PATENT DOCUMENTS
5,460,309 A * 10/1995 Nehl et al. ..................... 224/281
6,241,300 B1 * 6/2001 Suzuki ......................... 296/37.8

FOREIGN PATENT DOCUMENTS
| DE | 200 05 552 | 6/2000 |
| DE | 199 23 414 | 11/2000 |
| DE | 100 39 305 | 3/2002 |
| DE | 100 32 684 | 5/2002 |
| EP | 1 277 620 | 1/2003 |
| EP | 1 486 374 | 12/2004 |

* cited by examiner

*Primary Examiner* — Dennis Pedder
(74) *Attorney, Agent, or Firm* — Michael J. Striker

(57) ABSTRACT

The invention relates to a storage compartment (1) having a pivotable cover (5). The invention proposes that the cover (5) be mounted on a slider member (3) and driven with a constraining kinematic arrangement (15) so that, during opening, the cover (5) is in the first instance displaced with the slider member (3) in parallel and is then pivoted upwards, the cover (5) being displaced further with the slider member (3) during pivoting.

4 Claims, 9 Drawing Sheets

KINEMATIC ARRANGEMENT FOR A COVER OF A STORAGE COMPARTMENT IN A VEHICLE

BACKGROUND OF THE INVENTION

The invention relates to a kinematic arrangement for a cover of a storage compartment in a vehicle, especially a motor vehicle.

Storage compartments that are closable by pivotable covers in motor vehicles are known per se.

The problem of the invention is to combine, preferably forcibly, a rotational movement, that is to say a pivoting movement, with a translational movement, that is to say a displacement of the cover of a storage compartment.

SUMMARY OF THE INVENTION

The kinematic arrangement according to the invention has a slider member which is displaceably guided in an opening direction by a sliding guide means. The cover is pivotally mounted on the slider member by means of a pivot bearing. For opening the storage compartment, the slider member together with the cover is displaced and in so doing the cover is moved a short distance away from the storage compartment. The cover is then pivoted into an open position. The order in which the cover is displaced and pivoted is not essential for the invention, but is preferred.

In a preferred construction in accordance with the invention, the kinematic arrangement has a cogwheel which is rotatably mounted on the slider member and displaceably guided on the slider member and which meshes with fixed toothing arranged, for example, on the housing of the storage compartment. The cogwheel is therefore rotatable and its notional axis is displaceable relative to the slider member. Because the cogwheel meshes with the fixed toothing, displacement of the slider member sets the cogwheel in rotation. In addition, displacement of the axis of the cogwheel relative to the slider member is possible. Furthermore, the kinematic arrangement has a connector which is articulated on the cover. The connector has a toothed rack which meshes with the cogwheel approximately opposite the fixed toothing. A joint which joins the connector to the cover is spaced apart from the pivot bearing of the cover on the slider member. The movement of the cover on the slider member is controlled by way of the cogwheel and the connector. When the connector moves at the same speed as the slider member, a purely translational displacement of the cover is effected without the cover's pivoting. When the connector is displaced relative to the slider member, it pivots the cover. Such a construction in accordance with the invention derives the movement of the cover from the displacement of the slider member.

In a preferred construction in accordance with the invention, the kinematic arrangement has a travel limitation means for the displacement distance of the cogwheel on the slider member and/or a rotational angle limitation means for the cogwheel. The travel and/or rotational angle limitation means determine end positions of the cogwheel on the slider member. When the travel limitation means is reached, the cogwheel is forced to move with the slider member.

A preferred construction in accordance with the invention provides a constraining control means for the cogwheel on the slider member. The constraining control means forcibly determines the rotational angle of the cogwheel relative to the displacement distance of the cogwheel relative to the slider member. The rotated position of the cogwheel is thus unambiguously governed by the position of the slider member. By means of the constraining control means, a defined translational and/or rotational movement of the cover is possible. Constraining control is possible, for example, using a control-curve means, which has, for example, a control curve on the slider member in which a control lug of the cogwheel engages. Other constraining control means are also known and possible.

One construction in accordance with the invention provides a pivot angle limitation means for the cover on the slider member. As a result, a defined pivoted position of the cover is possible, for example, in the closed position as a result of the cover's making contact with the pivot angle limitation means.

One construction in accordance with the invention provides a rod as connector which has a wave-shaped section. When the cover is open, the wave-shaped section surrounds the pivot bearing of the cover over a portion of its periphery. The connector can thus be guided closely past the pivot bearing of the cover. Visual aspects also tell in favour of such a construction of the connector of the kinematic arrangement according to the invention.

A further preferred construction in accordance with the invention provides a control element which controls the pivoting movement of the cover in dependence upon the displacement or position of the slider member. In the closed position, the control element blocks the cover from pivoting and allows the cover to pivot in the opening direction only after the slider member has covered a predetermined displacement distance in the opening direction. The control of the control element is effected by the opening and closing of the cover, which also includes the displacement of the slider member. With that kinematic arrangement according to the invention too it is possible to effect the desired movement of the cover in the first instance by displacement of the slider member translationally away from the storage compartment and subsequent pivoting of the cover.

In a preferred construction, the control element is guided so as to be displaceable with respect to the slider member. The control element can be guided on the storage compartment and/or on the slider member. The control element can likewise be a slider member.

A development of the invention provides a pivot lever on which both the slider member and the control element are articulated. The articulated connections of the slider member and the control element on the pivot lever are spaced apart from the pivot axis thereof by different amounts, however. Displacement of the slider member causes the pivot lever to pivot about its pivot axis. By way of the articulated connection, the pivot lever displaces or generally moves the control element. Because the articulated connections of the slider member and the control element on the pivot lever are spaced apart from the pivot axis thereof by different amounts, the lengths of the displacement distances of the slider member and the control element are different; the control element moves with respect to the slider member. That relative movement is used for unlocking and locking the cover against pivoting on the slider member. The term "pivot lever" does not relate to its shape, but denotes generally a pivotable element which, by virtue of the difference in the axial spacings of the articulated connections on the slider member and the control element, gives rise to different lengths of travel when the slider member and the control element are moved and thus to the relative movement of the control element with respect to the slider member.

In one construction in accordance with the invention, the control element has a control curve in which a control member of the cover engages, which control member is arranged on the cover spaced apart from the pivot bearing by means of which the cover is pivotally mounted on the slider member. The control member can be, for example, a control pin, a slide block or the like, which is displaceable in the control curve. As a result of the relative movement of the control element with respect to the slider member, the control member of the cover is displaced in the control curve. By virtue of the shape of the control curve, the desired blocking of the cover against pivoting in the closed position is achieved. The control curve can form a block against pivoting or it can control, that is to say pivot, the cover after the cover has been moved away from the storage compartment by displacement of the slider member.

DETAILED DESCRIPTION OF THE PREFERRED EMBODIMENTS

Figure 1A:
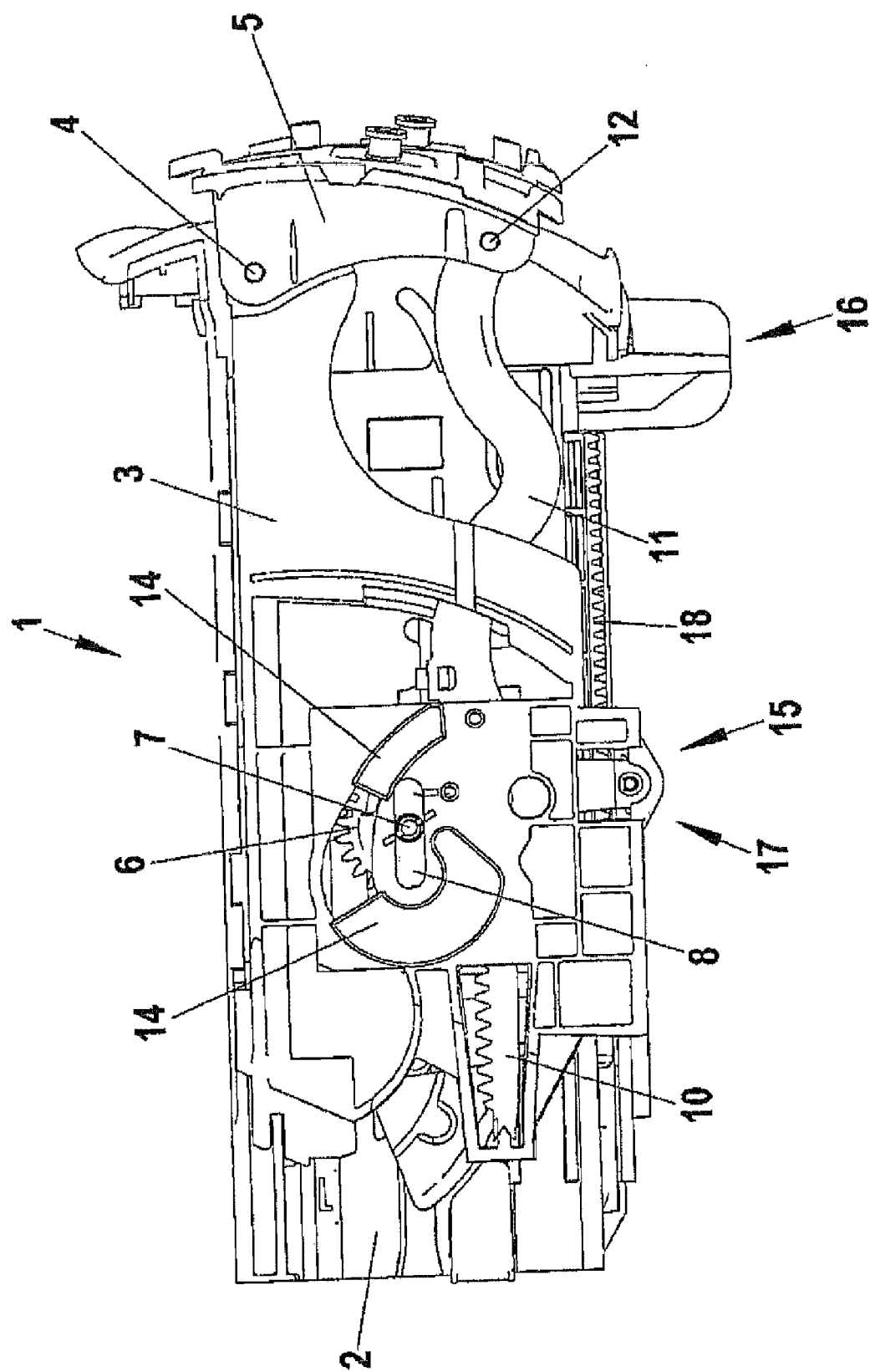
FIGS. 1a, 1b show a first embodiment of the storage compartment according to the present invention with the cover closed.
Figure 1B:
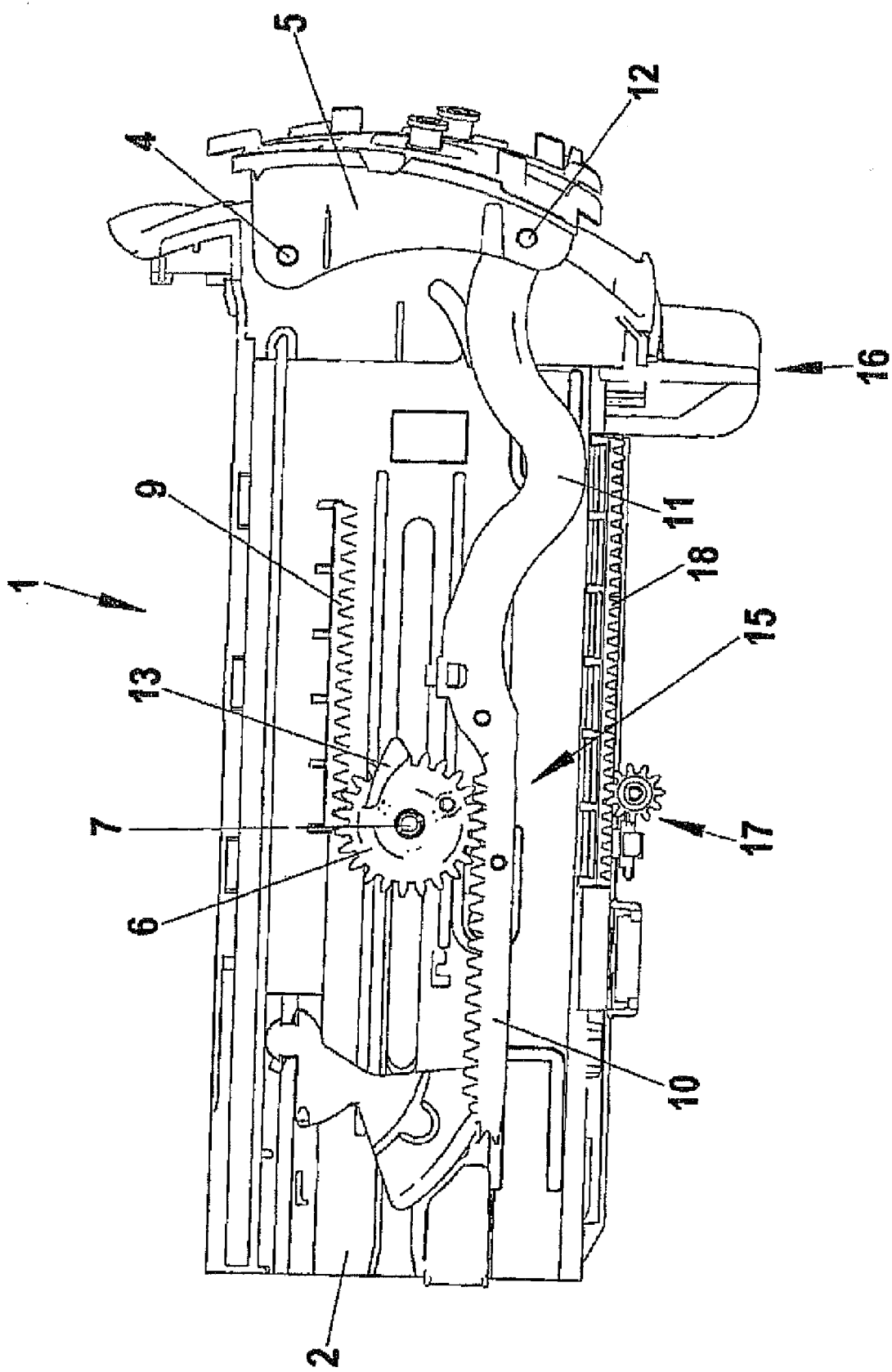
Figure 2A:
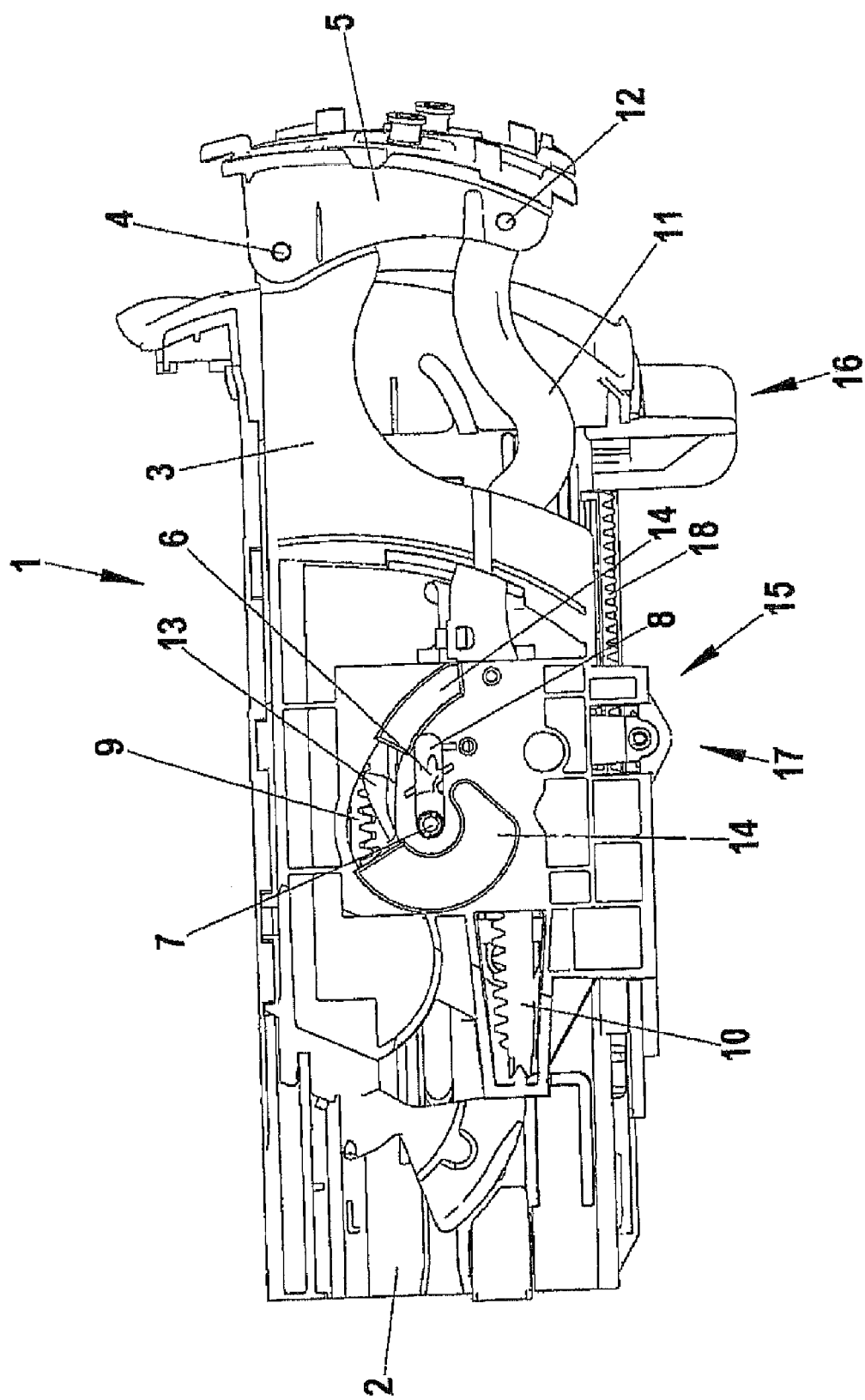
FIGS. 2a, 2b show the cover of FIGS. 1a, 1b lifted away from the storage compartment.
Figure 2B:
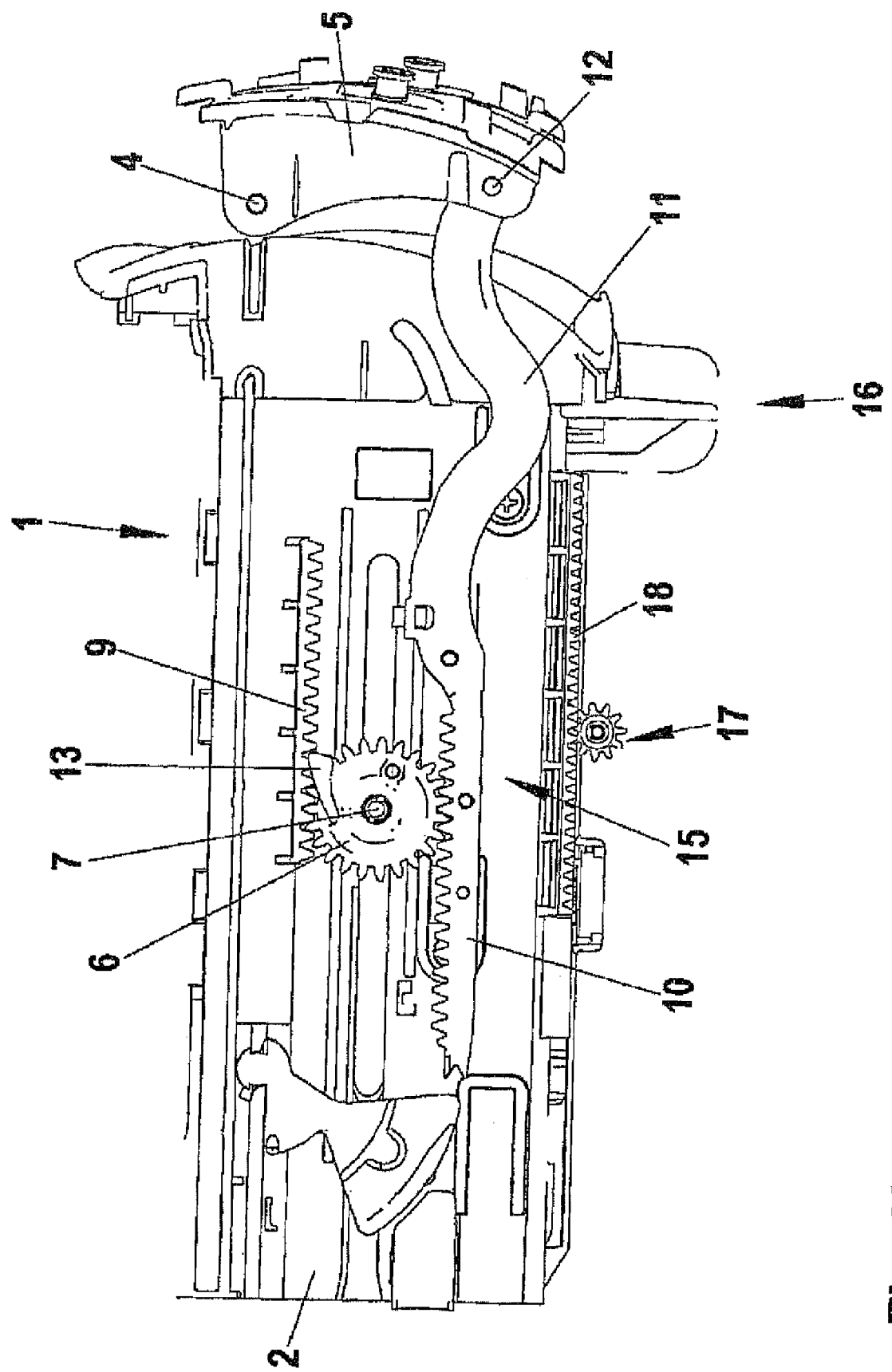
Figure 3A:
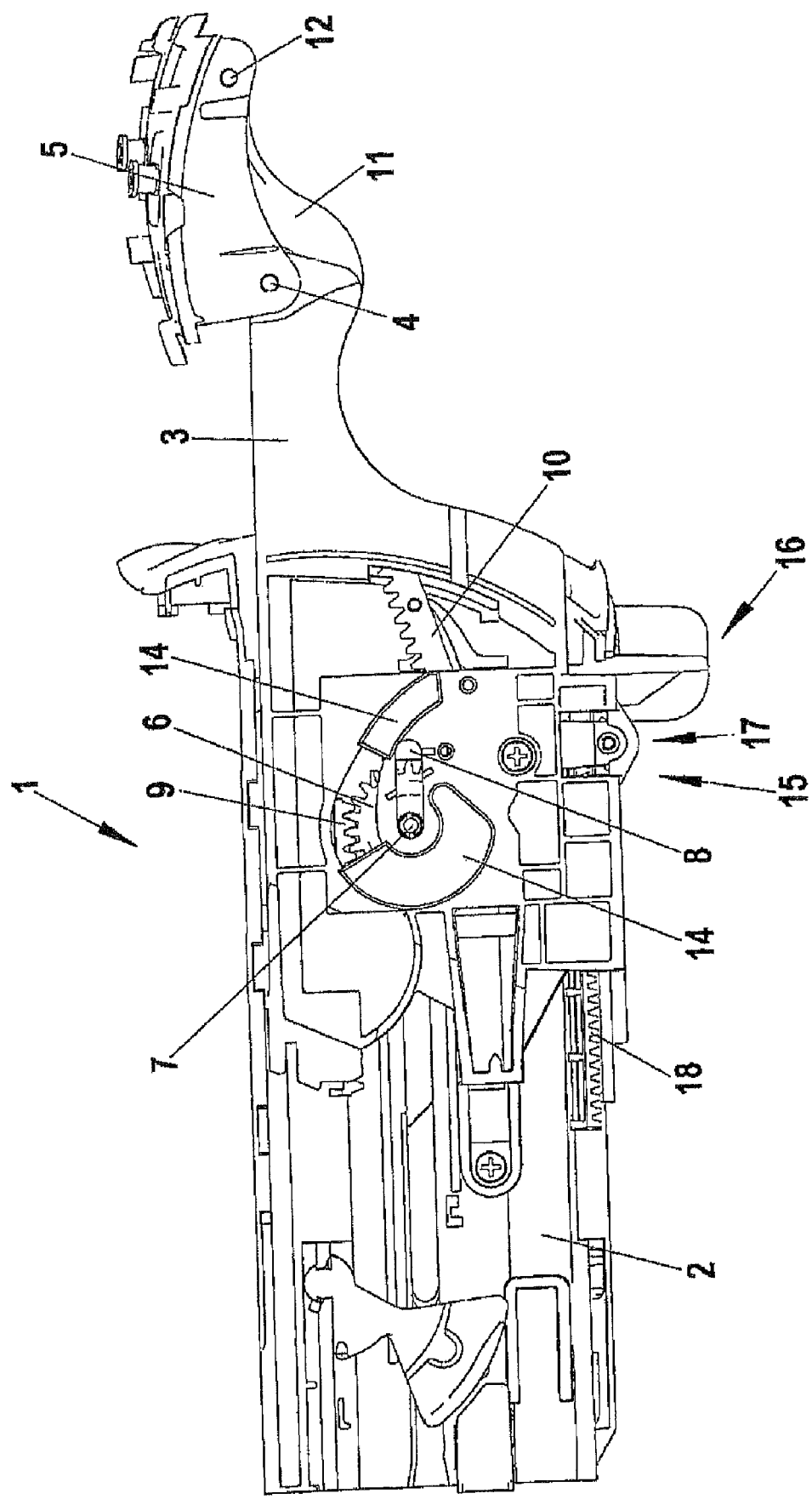
FIGS. 3a, 3b show the cover open.
Figure 3B:
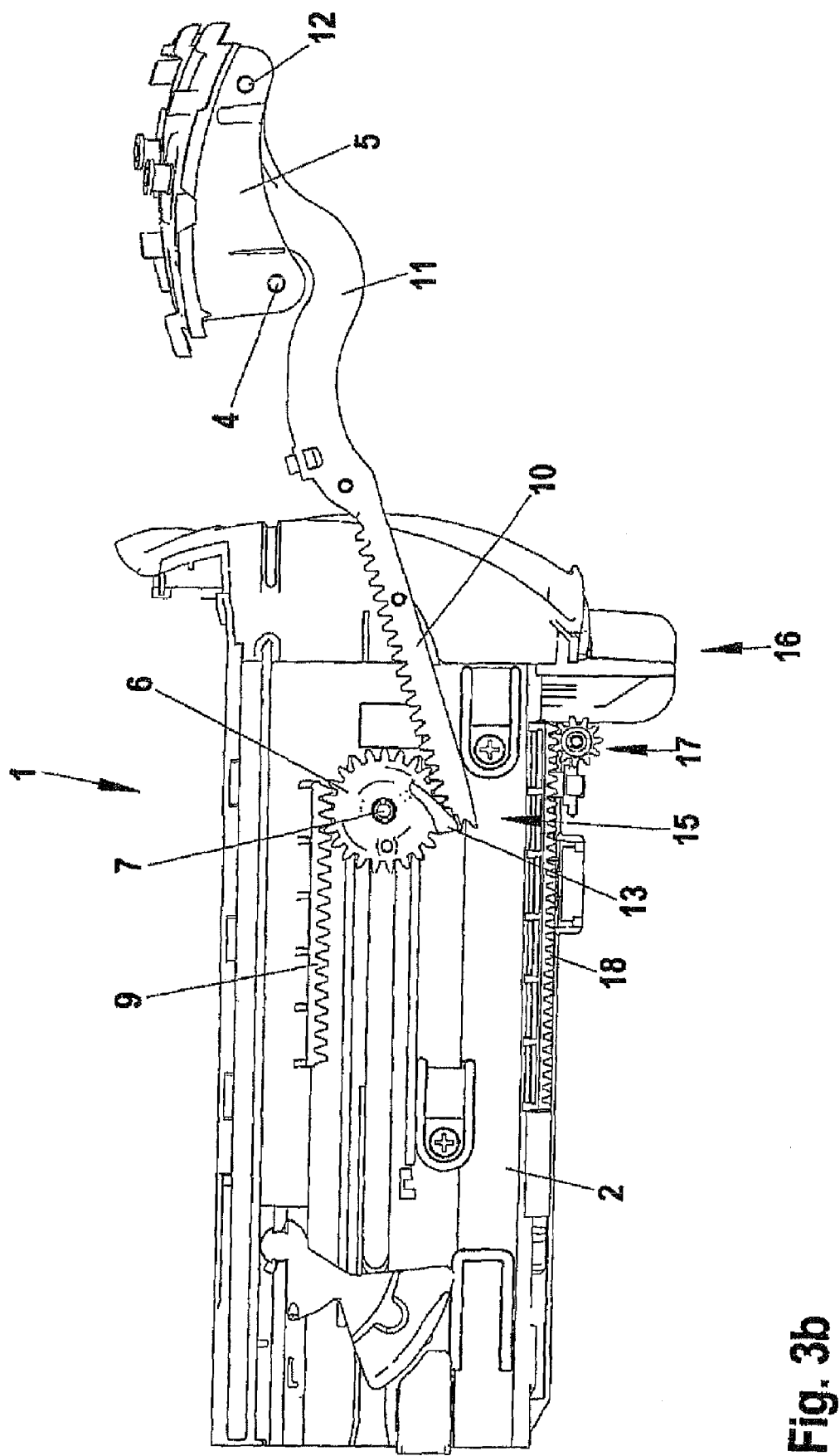
Figure 4:
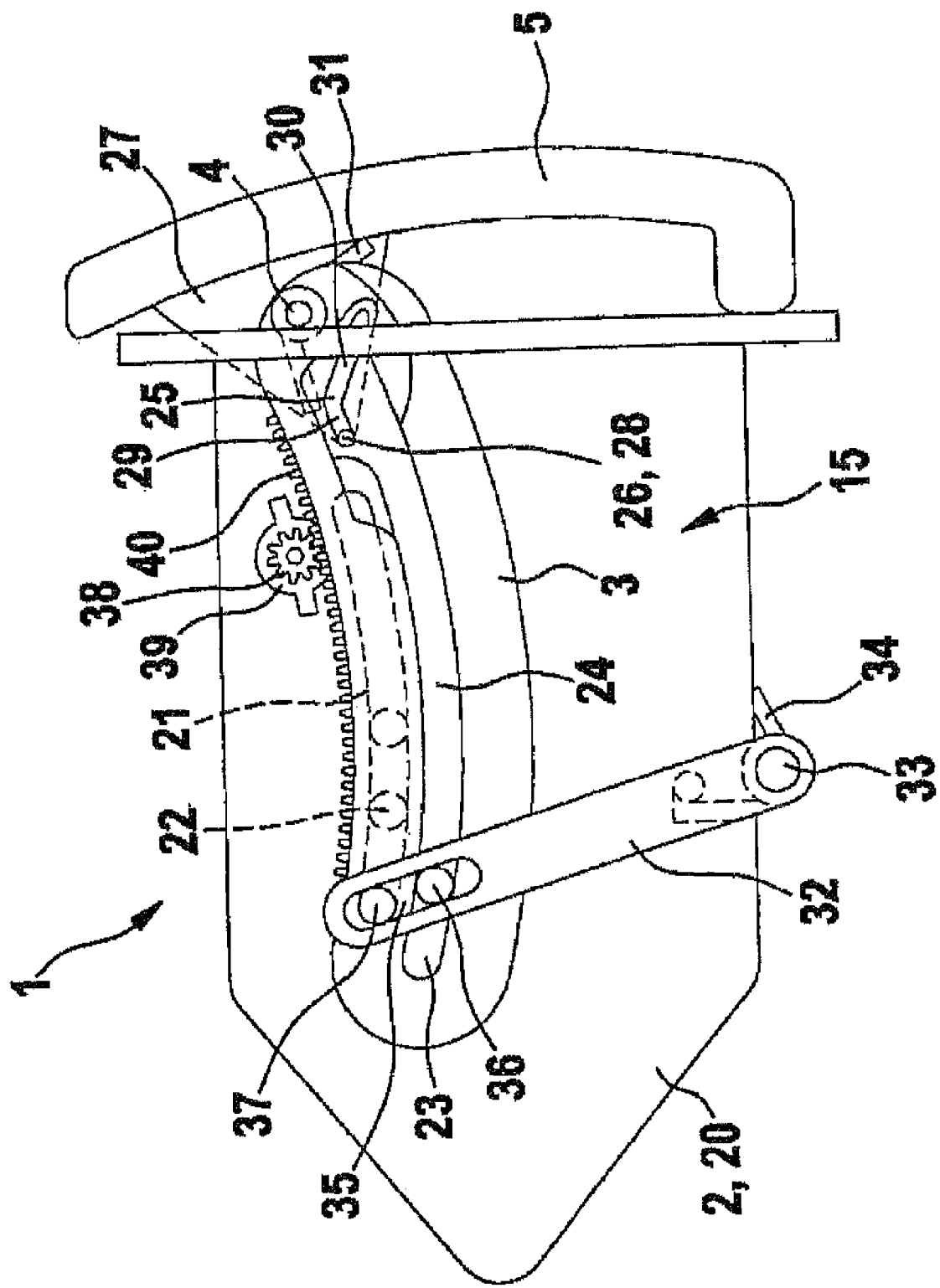
FIGS. 4 through 6 show a second embodiment of the storage compartment according to the present invention with its cover in various positions.
Figure 5:
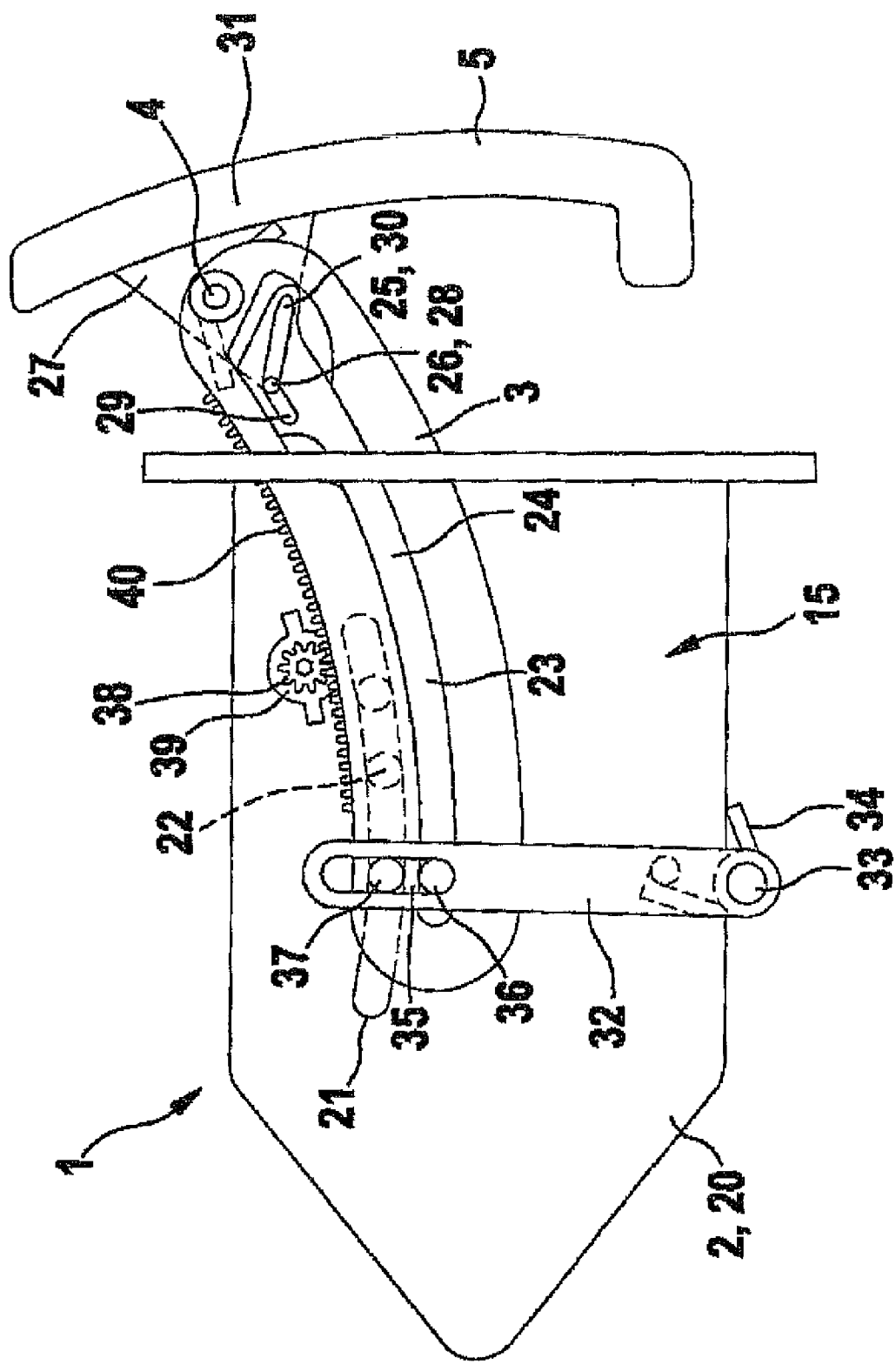
Figure 6:
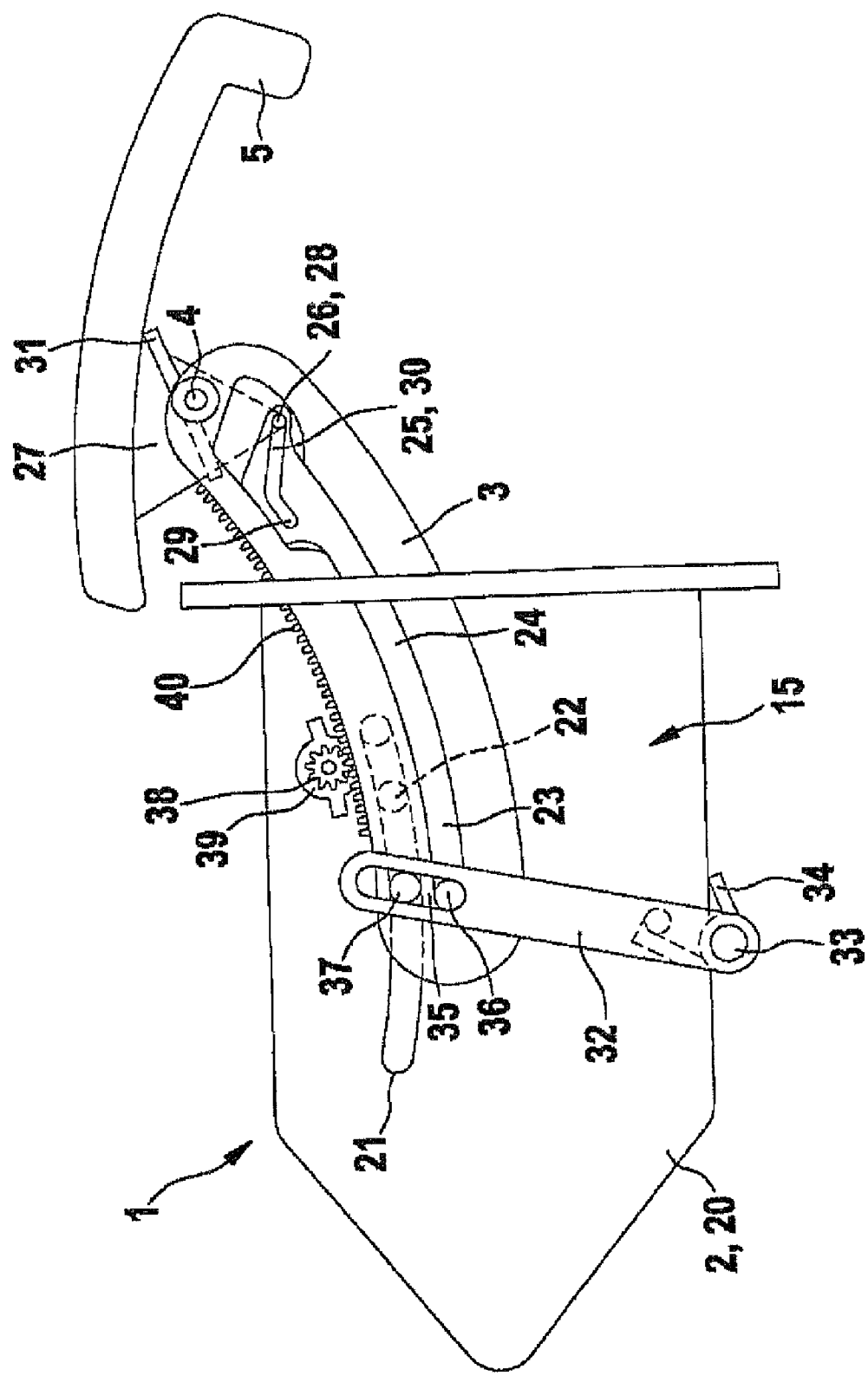

The invention is described in greater detail below with reference to two exemplary embodiments shown in the drawing. FIGS. 1 to 3, in each case a and b, show a first exemplary embodiment of a storage compartment having a kinematic arrangement according to the invention in side view, FIGS. 1a, b showing the storage compartment with the cover closed, FIGS. 2a, b showing the cover lifted away from the storage compartment and FIGS. 3a, b showing the cover open. FIGS. 1a, 2a and 3a show the storage compartment with a slider member, while in FIGS. 1b, 2b and 3b the slider member has been omitted. FIGS. 4 to 6 show a second exemplary embodiment of a storage compartment having a kinematic arrangement according to the invention in side view with its cover in various positions.

The storage compartment 1 shown in FIGS. 1 to 3, in each case a and b, has a box-shaped housing 2 that is open at the front side. On the housing 2 there is arranged a slider member 3 which engages around the housing 2 at the sides and the underside. The slider member 3 is guided on the housing 2 so as to be displaceable in the longitudinal direction.

At the front side of the slider member 3 and at the top relative to the housing 2, the slider member has on each side of the storage compartment 1 a pivot bearing 4 by means of which a cover 5 is mounted on the slider member 3 so as to be pivotable about a notional horizontal pivot axis. Viewed from the side, the pivot bearings 4 are in register with one another and coaxial.

At each side of the slider member 3, a cogwheel 6 is rotatably mounted and guided on the slider member 3 so as to be displaceable in the displacement direction of the slider member 3. For that purpose, the cogwheel 6 has a stub shaft 7 which is accommodated in a slot 8 extending in the displacement direction of the slider member 3. As mentioned, the cogwheel 6 is rotatably mounted and guided in the slot 8 so as to be displaceable in the displacement direction of the slider member 3. The slot 8 is limited at each end; it forms a travel limitation means for the displacement of the cogwheel 6 relative to the slider member 3. Viewed from the side, the two cogwheels 6 on the two sides of the storage compartment 1 and the slider member 3 are arranged in register with one another.

The cogwheel 6 meshes with a fixed toothed rack 9 which is arranged on the outside on a side wall of the housing 2 of the storage compartment 1 (FIGS. 1b, 2b, 3b). The toothed rack 9 extends in the longitudinal direction of the housing 2, that is to say in the displacement direction of the slider member 3. The toothed rack 9 is arranged above the cogwheel 6.

On the underside, that is to say approximately opposite the fixed toothed rack 9, the cogwheel 6 meshes with a toothed rack 10 of a rod 11 (FIGS. 1b, 2b, 3b). The rod 11 is straight in the region of its toothed rack 10 and then extends onwards in a wave shape towards the cover 5. The rod 11 is pivotally connected to the cover 5 by means of a joint 12. The joint 12 is joined to the cover 5 close to the lower edge of the cover 5, that is to say spaced apart from the pivot bearing 4 by means of which the cover 5 is pivotally connected to the slider member 3. The rod 11 forms a connector to the cover 5.

On its outer end face facing the slider member 3, the cogwheel 6 has a laterally projecting control lug 13 (FIGS. 1b, 2b, 3b). Seen in end view onto the cogwheel 6, the control lug 13 has the shape of a curved wedge which extends spirally over a short peripheral portion of the cogwheel 6. The control lug 13 engages in a groove in the slider member 3, which groove is referred to as control curve 14. The control curve 14 is arranged around the slot 8 in the slider member 3 in which the cogwheel 6 is rotatably mounted and displaceably guided. The control curve 14 does not form a closed track but is open and does not surround the slot 8 around its entire periphery. In a rear region remote from the cover 5, the control curve 14 extends in an arc of a circle with its centre around the rear end of the slot 8 remote from the cover 5. In its further progress, the control curve 14 extends at the top over the slot 8 towards the front in the direction of the cover 5. In that region, the control curve 14 is spiral; its curvature becomes smaller, that is to say the radius of curvature becomes greater.

The control curve 14 forms a rotational angle limitation means for the cogwheel 6; it limits the rotational angle of the cogwheel 6 as a result of the control lug 13 striking the ends of the control curve 14. The control lug 13 and the control curve 14 form a constraining control means for the cogwheel 6 on the slider member 3, which constraining control means forcibly determines the rotational angle or the rotated position of the cogwheel 6 in dependence upon the displacement distance of the cogwheel 6 relative to the slider member 3. The rotated position of the cogwheel 6 is unambiguously governed by the position of the cogwheel 6 relative to the slider member 3, i.e. the position of the stub shaft 7 of the cogwheel 6 in the slot 8 of the slider member 3. The rotational angle limitation means of the cogwheel 6 is not absolutely necessary for the kinematic arrangement according to the invention.

The slider member 3, the cogwheel 6 and the rod 11 form a kinematic arrangement 15 according to the invention for the cover 5; they determine the movement of the cover 5 during opening and during closing. Viewed from the side, the slider member 3, the cogwheel 6 and the rod 11 on the two sides of the housing 2 are in register with one another.

For opening, the slider member 3 is displaced on the housing 2 towards the front out of its position shown in FIGS. 1a, b via the position shown in FIGS. 2a, b into the position shown in FIGS. 3a, b. The cover 5 moves together with the slider member 3, the cover being pivotally mounted on the slider member 3 at the top by means of the pivot bearings 4.

When the slider member 3 is located in position with the cover 5 closed, that is to say in the rear position shown in FIGS. 1a, b, the stub shaft 7 of the cogwheel 6 is located in a middle region of the slot 8 in the slider member 3. When the slider member 3 is displaced into the intermediate position shown in FIGS. 2a, b, the cogwheel 6 rotates, because it meshes with the fixed toothed rack 9. At the same time, the cogwheel 6 moves towards the rear relative to the slider member 3, that is to say away from the cover 5. The displacement of the cogwheel 6 relative to the slider member 3 is effected forcibly by the constraining control of the cogwheel 6 by means of the control curve 14 and the control lug 13. The constraining control is so configured that the displacement balances the rotation of the cogwheel 6. That means that the rod 11, with the toothed rack 10 of which the cogwheel 6 likewise meshes, is not displaced relative to the slider member 3, but the rod 11 is displaced together with the slider member 3 relative to the housing 2. As a result, the cover 5, together with the slider member 3, is displaced in parallel, that is to say exclusively translationally. That applies until the intermediate position shown in FIGS. 2a, b is reached. In that position, the stub shaft 7 of the cogwheel 6 reaches the rear end of the slot 8 remote from the cover 5. The cogwheel 6 cannot move any further to the rear relative to the slider member 3, that is to say away from the cover 5. In that position, the control lug 13 of the cogwheel 6 has also reached the end of the spiral portion of the control curve 14 and the beginning of its portion having the shape of an arc of a circle.

As the slider member 3 is displaced further out of the intermediate position shown in FIGS. 2a, b into the end position shown in FIGS. 3a, b, the cogwheel 6, as a result of its constraining control by means of the control lug 13 in the control curve 14 and because its stub shaft 7 has reached the end of the slot 8 in the slider member 3, performs exclusively a rotational movement in respect of the slider member 3. At the same time the cogwheel 6 moves together with the slider member 3. Because the cogwheel 6 meshes with the fixed toothed rack 9 at the side of the housing 2 and with the toothed rack 10 of the rod 11, the cogwheel 6, which is rotating and moving with the slider member 3, displaces the rod 11 at twice the speed of the slider member 3. As a result, as shown, the cover 5 is pivoted upwards into a horizontal, open position. At the same time, the cover 5 together with the slider member 3 is displaced towards the front, that is to say away from the housing 2; the pivot bearing 4 of the cover 5 on the slider member 3 is displaced together with the slider member 3.

The opening movement of the cover 5 is therefore in the first instance exclusively a parallel displacement out of the closed position shown in FIGS. 1a, b into the intermediate position shown in FIGS. 2a, b, and then a superposition of a displacement and a pivoting movement out of the intermediate position shown in FIGS. 2a, b into the open position shown in FIGS. 3a, b. The movement during closing of the cover 5 is the reverse, that is to say in the first instance a superposition of a pivoting movement of the cover 5 out of the horizontal position downwards into a vertical position with a displacement of the cover 5 towards the housing 2 and then a parallel displacement of the cover 5 right up to the housing 2. The described movement of the cover 5 during opening and during closing is effected forcibly by the constraining control by means of the control lug 13 and the control curve 14 of the kinematic arrangement 15 according to the invention.

The opening of the cover 5 is effected by spring actuation by means of two scroll springs which, viewed from the side, are mounted in register with one another at the location indicated by 1b on the underside of the housing 2 and the uncoilable ends of which are mounted on the portion of the slider member 3 extending under the housing 2. The scroll springs also consist of self-winding sheet metal strips; they are tension springs.

The displacement of the slider member 3 is damped by rotation dampers 17 which are arranged on the underside of the slider member 3 and mesh with a toothed rack 18 of the housing 2.

In the closed position, the slider member 3 is held against the force of the scroll springs by a push-push mechanism which is arranged on the underside of the housing 2 and engages the slider member 3. The push-push mechanism is concealed in the drawing and therefore cannot be seen. Such push-push mechanisms are known per se and therefore need not be explained herein. Such a mechanism is a locking device which, when the cover 5 is being closed, engages the slider member 3 when the slider member 3 reaches its rear end position shown in FIGS. 1a, b and which, when the slider member 3 is pushed in (by pressure on the cover 5) a short way beyond the end position, is unlocked so that the slider member 3 is then displaced towards the front by the force of the scroll springs 16.

The pivot angle of the cover 5 in its closed position is limited by its making contact with the front side of the slider member 3.

When the cover 5 is open (FIGS. 3a, b), the rod 11 surrounds the pivot bearing 4 of the cover 5 on the slider member 3 with a portion of its wave-shaped section, which portion is concave seen from the pivot bearing 4. By virtue of the wave shape, when the cover 5 is open the rod 11 conforms to the shape of the underside of the cover 5, of the pivot bearing 4 and of the slider member 3, instead of extending free underneath the slider member 3, spaced apart therefrom, as would be the situation in the case of a straight rod.

In the following description of FIGS. 4 to 6, components corresponding to FIGS. 1 to 3 have been given the same reference numerals. FIGS. 4 to 6 show a second exemplary embodiment of a storage compartment 1 having a kinematic arrangement 15 according to the invention. The storage compartment 1 has a box-shaped housing 2 that is open at the front side, on each of the two sides of which a slider member 3 is arranged. A kinematic arrangement including the slider member 3 is present on each side of the housing 2, as also in FIGS. 1 to 3, each in register with the other; the kinematic arrangement 15 on one side of the housing 2 will be described. The slider member 3 is guided on the housing 2 so as to be displaceable in the longitudinal direction. For that purpose, in each of the side walls 20 of the housing 2 there is provided a slot 21 in the shape of an arc of a circle extending in the longitudinal direction of the slider member 3. Three guide pins 22, which project inwards from slider member 3, engage in the slot 21. The guide pins 22 and the slot 21 form a sliding guide means for the slider member 3. On the forward end and at the top relative to the housing 2, the slider member 3 has a pivot bearing 4 by means of which a cover 5 is mounted on the slider member 3 so as to be pivotable about a notional horizontal pivot axis. In FIG. 4, the forward end of the slider member 3 is located in the region of an opening on the front side of the housing 2. By displacement, as can be seen in FIGS. 5 and 6, the slider member 3 projects beyond the housing 2 at the front; the pivot bearing 4 is located in front of the opening in the housing 2.

The slider member 3 has a slot 23 in the shape of an arc of a circle, which slot is concentric with the slot 21 in the side wall 20 of the housing 2. A control element 24 is displaceably guided in the slot 23 in the slider member 3, which control element likewise forms a slider member. At its forward end close to the pivot bearing 4, the control element 24 has a control curve 25 in which a control member 26 of the cover 5 engages. The control member 26 comprises a lever 27 which projects rigidly from the rear side of the cover 5 and the end of which remote from the cover 5 has a pin 28 which engages in the control curve 25 of the control element 24. The pin 28, which is part of the control member 26, is spaced apart from the notional pivot axis of the pivot bearing 4. The "rear side" is to be understood as being the side of the cover 5 that faces the housing 2. In a first portion 29, the control curve 25 extends in an arc of a circle concentric with the slot 21 in the side wall 20 of the housing 2 and with the slot 23 in the slider member 3 in which the control element 24 is displaceably guided. The first portion 29 of the control curve 25 extends towards the notional pivot axis of the pivot bearing 4. When the pin 28 of the control member 26 is located in the first portion 29 of the control curve 25, the control curve 25 prevents the cover 5 from pivoting; the cover 5 is blocked from pivoting. In a second portion 30, the control curve extends in an arc, not necessarily an arc of a circle, or alternatively is straight and not concentric around the notional pivot axis of the pivot bearing 4. The shape of the second portion 30 of the control curve 25 is so chosen that the cover 5 is able to pivot when the pin 28 of the control member 26 is located in that second portion 30 of the control curve 25. A spring element 31 arranged on the pivot bearing 4 is supported on the slider member 3 and acts upon the cover 5 in the opening direction. In the exemplary embodiment, the spring element 31 is a helical or leg spring, that is to say a torsion spring.

The control element 24, which is displaceably guided in the slider member 3, is coupled to the slider member 3 by a pivot lever 32. The pivot lever 32 is arranged, like the slider member 3 and the control element 24, on the side wall 20 of the housing 2; it overlaps the slider member 3 and the control element 24. The pivot lever 32 extends as far as the underside of the housing 2 where it is arranged on a shaft 33 for conjoint rotation therewith, which shaft extends under the housing 2 and is rotatably mounted on the underside of the housing 2. The shaft 33 rigidly joins together the pivot levers 32 on the two sides of the housing 2 which are in register with one another. As a result, the pivot levers 32 on the two sides of the housing 2 are forced to pivot together. A spring element, referred to as main spring 34, acts upon the pivot lever 32 in the opening direction in the direction towards the open front side of the housing 2. In the exemplary embodiment, the main spring 34 is a helical or leg spring.

The pivot lever 32 has at its end remote from the shaft 33 a longitudinal slot 35 in which a pin 36 of the control element 24 and a pin 37 of the slider member 3 engage. The pins 36, 37 project outwards from the control element 24 and from the slider member 3. The pins 36, 37 are displaceable in the longitudinal slot 35, that is to say radially with respect to the notional pivot axis of the pivot lever 32. By means of the pins 36, 37, the control element 24 and the slider member 3 are articulated on the pivot lever 32. The pins 36, 37 are spaced apart from the shaft 33, which defines the notional pivot axis of the pivot lever 32, by different amounts. The pin 37 of the slider member 3 is spaced apart from the shaft 33 by a greater amount than is the pin 36 of the control element 24 from the shaft 33. When the slider member 3 is displaced, it pivots the pivot lever 32 by way of its pin 37. By way of the pin 36, the pivoting pivot lever 32 displaces the control element 24. Because the pins 36, 37 of the control element 24 and the slider member 3 are spaced apart from the shaft 33 by different amounts, the displacement distances of the control element 24 and the slider member 3 are of different lengths, that is to say the control element 24 is displaced with respect to the slider member 3. By virtue of the greater distance of the pin 37 of the slider member 3 from the shaft 33 of the pivot lever 32, the displacement distance of the slider member 3 is greater than the displacement distance of the control element 24.

During opening, the pivot lever 32 in FIGS. 4 to 6 pivots clockwise to the right, towards the front relative to the housing 2, in the direction of the open front side of the housing 2. The pivot lever 32 is pivoted by the main spring 34. During pivoting, the pivot lever 32 displaces the slider member 3 and the control element 24 out of the position shown in FIG. 4, in which the slider member 3 barely projects beyond the front side of the housing 2, via the position shown in FIG. 5, in which the slider member 3 projects beyond the front side of the housing 2, as far as the position shown in FIG. 6, in which the slider member 3 projects further beyond the front side of the housing 2, that is to say to the right in the drawing. As a result of the coupling via the pivot lever 32, the control element 24 is displaced with the slider member 3, but the displacement distance of the control element 24 is shorter than the displacement distance of the slider member 3. As a result of that movement of the control element 24 with respect to the slider member 3, the pin 28 of the control member 26 of the cover 5 moves in the control curve 25 of the control element 24. When the pin 28 is located in the position shown in FIG. 1 in the first portion 29 of the control curve 25, it arrives in the position shown in FIG. 5 at the transition from the first portion 29 to the second portion 30 of the control curve 25 and moves further in the second portion 30 as far as the end thereof, as can be seen in FIG. 6. Because the first portion 29 of the control curve 25 runs towards the notional pivot axis of the pivot bearing 4, the control curve 25 blocks the cover 5 from pivoting as long as the pin 28 is located in the first portion 29 of the control curve 25. When the pin 28 passes into the second portion 30 of the control curve 25, the cover 5 is able to pivot, the pivoting being effected by the spring element 31 of the cover 5 and being controlled by the second portion 30 of the control curve 25. During opening, the cover 5 accordingly moves in the first instance translationally out of the closed position shown in FIG. 4 away from the open front side of the housing 2 into the position shown in FIG. 5. The cover 5 then pivots upwards into the open position shown in FIG. 6, while at the same time being displaced with the slider member 3 further away from the housing 2. The translational movement of the cover 5 between the positions shown in FIGS. 4 and 5 has a slight rotation superposed on it as a result of the sliding guide means of the slider member 3 having the shape of an arc of a circle.

The closing of the cover 5 is effected in the reverse order, the cover 5 being pivoted downwards against the force of the spring element 31 and then being pushed against the force of the main spring 34 onto the open front side of the housing 2, which it closes. A so-called push-push mechanism (not shown) locks the cover 5 in the closed position against the force of the main spring 34. By pressure against the closed cover 5, the push-push mechanism is unlocked in a manner known per se and the cover 5 is opened by spring actuation as described. The movement of the cover 5 is damped by a rotation damper 39, the cogwheel 38 of which meshes with toothing 40 of the slider member 3. The kinematic arrangement 15 according to the invention comprises the slider member 3, the control element 24, the pivot lever 32, which couples the control element 24 to the slider member 3, and the control curve 25 of the control element 24 in which the control member 26 engages with the pin 28 of the cover 5. The said components 3, 24, 25, 26, 28, 32 are arranged in register with one another on the outside of the two side walls 20 of the housing 2. The kinematic arrangement 15 also comprises the shaft 33 which joins the pivot levers 32 rigidly together.

The invention claimed is:

1. Kinematic arrangement for a cover (5) of a storage compartment (1) in a motor vehicle, having the cover (5) which for opening and closing is mounted so as to be pivotable by means of a pivot bearing (4), wherein the kinematic arrangement (15) has a slider member (3) which is displaceably guided in the opening direction; and the cover (5) is pivotally mounted on the slider member (3) by means of the pivot bearing (4), wherein the kinematic arrangement (15) has a control element (24) which in a closed position blocks the cover (5) from pivoting and allows the cover (5) to pivot only after displacement of the slider member (3), and the control element (24) controls opening and closing of the cover (5), wherein the slider member (3) and the control element (24) are articulated on a pivot lever (32) at different distances from the pivot axis of the pivot lever (32).

2. Kinematic arrangement according to claim 1, wherein the cover (5) has a pivot angle limitation means on the slider member (3).

3. Kinematic arrangement according to claim 1, wherein the control element (24) is guided so as to be displaceable with respect to the slider member (3).

4. Kinematic arrangement according to claim 1, wherein the control element (24) has a control curve (25) in which a control member (26) of the cover (5) engages, which control member is arranged on the cover (5) spaced apart from the pivot bearing (4) by means of which the cover (5) is pivotally mounted on the slider member (3).

* * * * *